June 17, 1958 H. N. LADEN 2,839,674

FREQUENCY SHIFT TRANSMITTER SYSTEM

Filed Oct. 22, 1953 2 Sheets-Sheet 1

INVENTOR.
HYMAN N. LADEN

BY George Lipkin
B. L. Zangwill
ATTORNEYS

INVENTOR.
HYMAN N. LADEN

BY George Siplin
B. L. Zangwill
ATTORNEYS 2,839,674

FREQUENCY SHIFT TRANSMITTER SYSTEM

Hyman N. Laden, Silver Spring, Md., assignor, by mesne assignments, to the United States of America as represented by the Secretary of the Navy Application October 22, 1953, Serial No. 387,819

5 Claims. (Cl. 250—8)

The present application is a continuation-in-part of the copending application of Hyman N. Laden, Serial No. 163,133, filed May 20, 1950, for Transmitter System, now abandoned.

This invention relates to communication systems employing frequency-shift keying.

In frequency-shift keying systems, a carrier wave is frequency modulated by shifting the carrier frequency a predetermined amount on either side of a normal or mean frequency. When ordinary hand keying is employed, the frequency emitted during key-up intervals is known as the space frequency. During key-down intervals the frequency emitted is known as the mark frequency.

In a conventional frequency-shift keying system the transmitter operates continuously, supplying energy alternately at the mark and the space frequency.

This invention provides a frequency-shift keying system in which the transmitter is in operation approximately only 50% of the time. It is merely keyed on-off and supplies energy only at one frequency when it is keyed on, to an antenna resonant at that frequency. When the transmitter is turned off its antenna circuit is synchronously tuned to and radiates energy at a different frequency. Since at the switching instant there are circulating currents and/or charges existing in the antenna circuit the antenna circuit will oscillate at the new frequency to which it has been tuned. The stored energy which only provokes transients in normal systems, is thus used to transmit signals.

Another advantage of this invention is that it permits existing high power, low frequency, amplitude-modulated transmitters to operate as frequency-shift keyed transmitters.

Still another advantage of this invention is that it provides signals detectable by either an amplitude-modulation or a frequency modulation receiver.

A further advantage of this invention is that means are provided for feeding energy from the transmitter to the antenna system in phase with the circulating currents already existing in the antenna system, thereby avoiding the creation of transients and securing greater efficiency from the system.

An object of this invention is to transmit signals during the off periods of a transmitter with energy stored in its antenna circuit during its on periods.

Another object of the invention is to operate a frequency-shift keyed system supplying power from the transmitter only at the mark frequency.

Another object of the invention is to devise a method of operating a frequency-shift transmitter system requiring energization only during mark intervals.

Another object of the invention is to provide means for turning a transmitter off and on, synchronously tuning its antenna system to one frequency when it is on and to a different frequency when it is off.

Another object of the invention is to reduce the power required by a frequency-shift keyed transmitter.

Another object of the invention is to increase the efficiency of frequency-shift keyed transmitters.

Another object of the invention is to enable amplitude-modulated transmitters to operate as frequency-shift keyed transmitters.

Another object of the invention is to devise a method of synchronous excitation of an antenna system.

A still further object of the invention is to provide a system wherein the transmitter is adapted to supply energy to the antenna system in phase with the circulating currents then present in the antenna system.

Other objects and many of the attendant advantages of the invention will be readily appreciated as the same becomes better understood by reference to the following detailed description when considered in connection with the accompanying drawings wherein.

Figure 1:
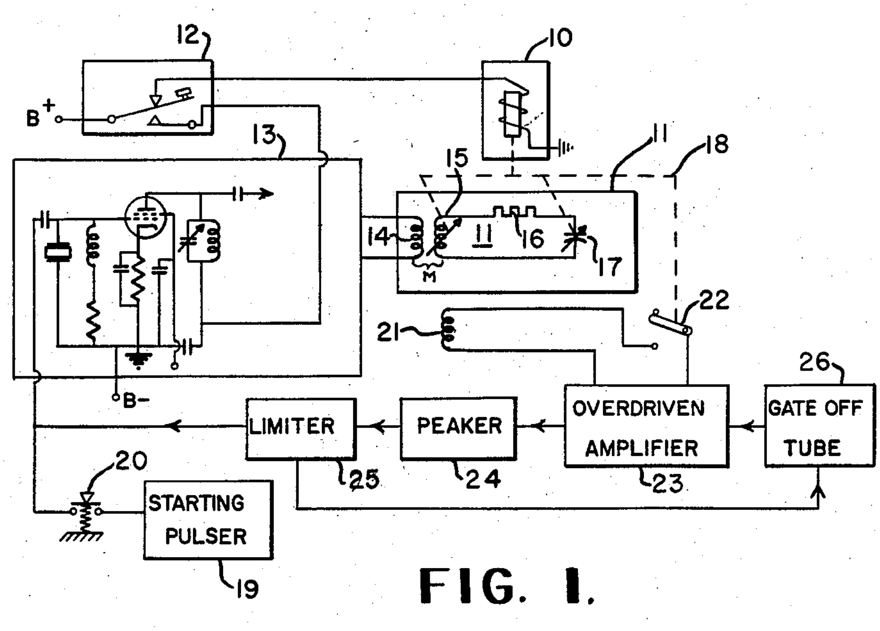
Fig. 1 is a schematic diagram of one form of the invention largely shown in block diagram form.

Referring now to Fig. 1 of the drawings, a transmitter system is shown in which the lumped constants of the antenna system are schematically indicated at 11. The antenna system has inductance represented by an inductor element 15. This inductance is made up of the lumped and distributed inductance of the antenna itself and the inductance of any element such as a base loading coil used to adjust the inductance of the antenna system as a whole to a desired value. The antenna system also has capacitance, here represented by the element 17 which is made up of the distributed capacitance, actual capacitance of the antenna to ground and capacitive elements such as series feed condensers or top-loading structure commonly used to adjust the total capacitance of the system to a desired value. The antenna system resistance represented at 16 is made up of the actual resistance of the antenna elements and the radiation resistance of the antenna. The added inductance and capacitance elements of the antenna system are, as is well known to those skilled in the art, commonly made adjustable so that the antenna system as a whole may be made resonant at the desired frequency.

A transmitter 13 is coupled to the inductor element 15 of the antenna circuit by an inductor 14, mutual coupling between the elements 14 and 15 existing as indicated by the bracket and letter M. The transmitter 13 includes as an element thereof a master oscillator which is schematically shown, the conventional amplifier stages of the transmitter being omitted to simplify the drawing. The oscillator is connected to the negative terminal of the B supply as shown and is adapted to be connected to the positive terminal through a keying device indicated at 12. The keying device is shown as a simple manual key but it is obvious that any of the automatic keying devices known to the prior art may be used. The keying device 12 is also used to control a tuning actuator means shown at 10. The tuning actuator means 10 in the simple form shown in Fig. 1, consists of a solenoid actuator coil adapted to be energized from the B supply through the keyer 12 in its up or off position. A mechanical linkage 18 attached to the solenoid core is designated schematically by the dotted lines. This linkage 18 connects the solenoid core to the adjustable elements of the inductor 15, the capacitor 17 and to an on-off switch 22. The purpose of these elements will be more fully described hereinafter.

A sampling coil 21 is loosely coupled in inductive relation to the inductor 15 and its terminals are connected through the switch 22 to the input of an overdriven amplifier 23. As indicated by the arrows shown on the connections the output of the overdriven amplifier 23 is fed to peaker or differentiating circuit 24 and thence to a limiter 25. The peaker and limiter elements are circuits well known in the art and require no further description. The output of the limiter is condenser coupled as shown to the control grid of the transmitter oscillator circuit and a second output channel of the limiter is used to control a gate off tube 26 which in turn is connected to the overdriven amplifier 23. A starting pulser source 19 is connected through a push button or momentary switch 20 to the grid of the transmitter oscillator.

A gate off tube 26 is fed from the output of limiter element 25 and controls the operation of the overdriven amplifier 23. The function of the gate off tube will be subsequently described.

The operation of the system of Fig. 1 will now be described. The oscillator section of transmitter is biased to a point where the application of plate potential will not set the circuit in oscillation. The circuit must be shock-excited from an external source before it will oscillate. To initially place the transmitter in operation the operator depresses the keyer 12, applying plate potential to the oscillator and then shock excites it by momentarily closing switch 20 thus coupling the starting pulser source 19 to the oscillator grid circuit. The transmitter now supplies energy to the antenna system 11 at the frequency of the oscillator or the mark frequency of the system, and this energy is radiated from the antenna. As long as the keyer 12 is depressed the antenna system is tuned to resonance at the mark frequency to achieve maximum radiation from the antenna. This tuning may be set by the adjustment of the previously mentioned variable components of the antenna system.

Assume the keyer 12 is now returned to its up or off position. The oscillator section of transmitter 13 is disabled by the disconnection of its plate supply and energy is no longer fed to the antenna system. The solenoid of tuning actuating means 10 is energized from the plate supply source and acts through mechanical linkage 18 to retune the antenna system by varying the values of inductance 15 and capacitance 16. In the event the space frequency is higher than the mark frequency as is usually the case the retuning may be accomplished by decreasing the coupling of the inductor 15 to the inductor 14, and/or decreasing the inductance of the inductor 15 and/or decreasing the capacity of capacitor 17. Switch 22 is also opened at this time by linkage 18.

During the on period of the transmitter, energy has been stored in the antenna system. This energy exists in the form of circulating currents in the resonant circuit of the antenna system 11. The antenna system has been retuned by operation of the tuning actuating means 10 and the stored energy will now oscillate in the antenna system at a frequency determined by the retuned circuit constants. During the circuit oscillation at the new frequency the stored energy will be radiated at the new resonant frequency. This is the space frequency of the system.

When the keyer is returned to its down or on position the tuning of the antenna system is restored to the original or mark frequency and switch 22 is closed. The oscillator of the transmitter, as previously pointed out, requires shock excitation. Sampling coil 21 inductively coupled to antenna system 11 has a voltage generated therein by the circulating currents existing in the antenna. The voltage induced in coil 21 passes through overdriven or saturating amplifier 23. The resulting substantially square wave form is passed through peaker circuit 24 to obtain a steep wave front and then passed through limiter 25 to the grid of the oscillator section of transmitter 13. This voltage shock excites the oscillator and reactivates the transmitter. The shock excitation voltage is derived from existing circulating currents in the antenna system. It activates the transmitter at such a time as to supply energy to the antenna system in phase with the already existing circulating currents in the system. This results in an efficient drive system for the antenna and a reduction in the generation of transients and consequent spurious radiation from the antenna.

If the sampling coil 21 and pulse generation system were allowed to remain effective during the entire transmitter on period the shock excitation link might interfere with the proper operation of the transmitter oscillator. The pulse output of limiter 25 is accordingly also used to operate a gate off tube 26 which generates a cut-off or disabling bias for the overdriven amplifier 23. The first pulse produced by the circulating currents, then, is effective to shock excite the transmitter oscillator and to disable the shock excitation system for the balance of the transmitter on period.

Starting pulser 19 is used only when initially starting the system. The synchronizing pulse system described is inoperative at this time because there is no stored energy existing in the form of circulating currents in the antenna system.

It will be apparent that the transmitter 13 is turned on only about 50% of the operating time. In the off position of the keyer 12 it is inoperative, the tuning actuator means being activated at this time to tune the antenna circuit to resonance at the space frequency. Upon return of the keyer to its on position it activates the tuning actuator means to tune the antenna circuit to resonance at the mark frequency, and at the same time it readies the phase synchronizing system by closing the switch 22. The transmitter remains inoperative initially. The antenna circuit rings at its mark resonant frequency for less than one cycle with the residual energy before the transmitter is shock excited by the circuit including sampling coil 21.

When a conventional amplitude modulated transmitter is keyed off the antenna will continue to radiate energy stored in the antenna system for an appreciably length of time. This energy is radiated at a frequency determined by the lumped antenna constants and differs very little, if any, from the frequency radiated during the transmitter on period. As the speed of keying of the system is increased this energy radiation after the disabling of the transmitter becomes a serious problem. Each transmitted pulse terminates in a damped wave train due to the dissipation of the stored energy. This trailing edge of the pulse tends to be extended until it merges into the leading edge of the following pulse. The resulting signals become difficult if not impossible to read. The problem becomes particularly important in the very low frequency band.

The present frequency-shift system causes the antenna to radiate the carrier wave of the transmitter during the mark or on periods with the antenna system tuned to resonance at this frequency. As the transmitter is disabled at the start of the space or off period the antenna system is synchronously retuned to a different resonant frequency. The stored energy in the antenna system will oscillate at a new and different frequency determined by the circuit constants of the returned antenna system. Energy radiated by the antenna during the space period will be of this new resonant frequency. An amplitude modulation receiver, sharply tuned to the mark frequency, will respond fully to the mark frequency and give little or no response to signals radiated at the space frequency. A frequency modulation receiver will vary its output in accordance with the frequency being radiated by the transmitter at any instant. Either type of receiver may be used with the transmitter system of the present invention and the readability of signals sent at increased keying speeds is much improved. The radiated signal characteristics are varied directly with the mark and space intervals and the receiver responds to the characteristics as radiated. The overlap due to decay time is substantially eliminated so far as the receiver is concerned due to the above described shift in radiated signal frequency.

The present invention also provides for applying energy to the antenna system from the transmitter in phase with the circulating currents existing in the antenna due to energy from the preceding transmission. Energization of the antenna system cophasally with existing current therein, results in a more efficient transmitter-antenna set up and avoids the formation of objectionable transients in the system. This mode of operation is obtained by using a transmitter oscillator requiring shock excitation to force it into oscillation and furnishing the shock excitation by a sampling of the existing circulating currents in the antenna system. Cophasal or splashless application of the transmitter voltage to the antenna system results. Readability is thus further improved by elimination of transient radiation and the efficiency of the system is increased.

Figure 2:
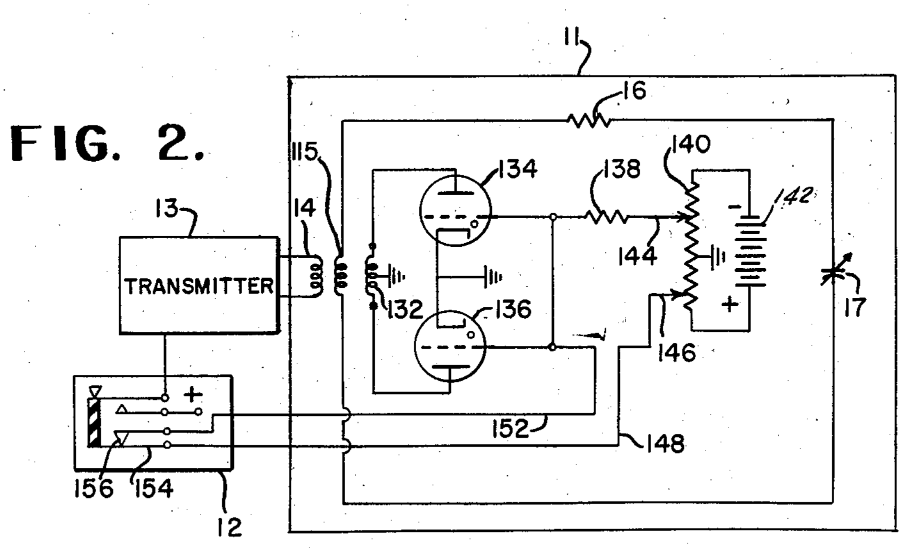
Fig. 2 is a showing of a portion of the system showing a specific tuning apparatus for the antenna circuit.

Referring now to Fig. 2 of the drawing a more specific form of antenna tuning apparatus is shown which may be used in place of the solenoid actuated mechanism generally described in connection with the system of Fig. 1 described above. Transmitter 13, the lumped antenna system 11 and the keying device 12 of Fig. 2 have been given the same reference characters as the corresponding elements of Fig. 1. The system functions in the same manner as described above. The lumped inductance element of the antenna system is shown as a variable inductor 115. A center-tapped coil 132 is inductively linked to inductor 115. The center-tap of coil 132 is connected to ground, as shown, and the two ends of the coil are connected to ground through variable impedance paths made up of anode-cathode circuits of thyratron tubes 134 and 136. The grids of the thyratrons are connected together and through a resistance element 138 to a source of bias supply. The bias source may be a battery 142 connected across a voltage divider resistor 140 having a fixed intermediate tap thereon connected to ground. The resistance 138 is connected to a variable slider or tap 144 so that the grid bias of the thyratrons may be set for one operating condition. A second slider or tap 146 is adapted to be connected to the thyratron grids through switch contacts 154—156 operated by the keying mechanism 12.

The effective inductance of coil 115 in the antenna circuit may be adjusted by controlling the impedance reflected into the antenna circuit through the agency of coil 132. The antenna circuit may be tuned to resonate at the mark frequency by adjusting slider 144 while keyer 12 is depressed and switch contacts 154—156 are open. At a definite value of grid bias voltage the effective value of inductance of coil 115 will be such as to tune the antenna circuit to resonance at the mark frequency. Subsequent to making the above described adjustment the keyer 12 is allowed to return to its normal position closing switch contacts 154—156. Variable tap or slider 146 is now connected directly to the thyratron grids and due to the isolating action of resistance element 138, this slider will primarily determine the grid bias. The antenna circuit is adjusted to resonate at the space frequency by setting slider 146 until the effective value of inductance is that required. Usually the space frequency will be higher than the mark frequency so the inductance will be less than that used for the mark frequency.

Figure 3:
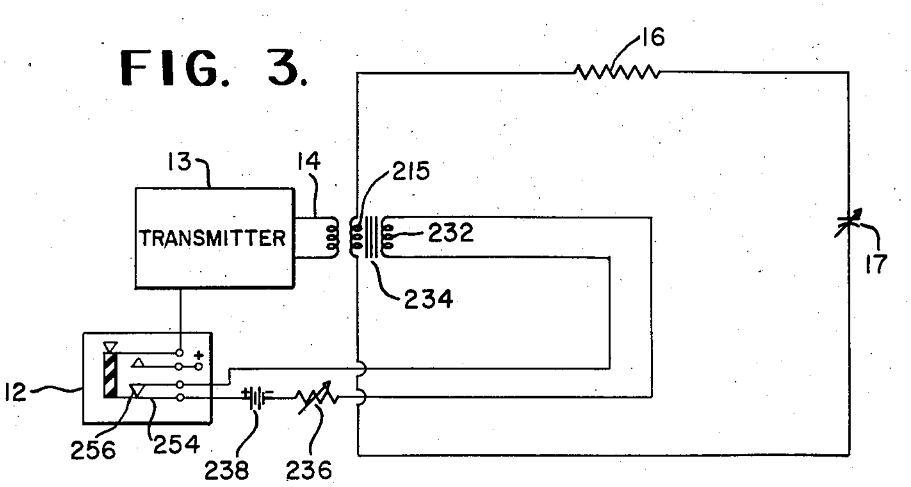
Fig. 3 is another showing of a portion of the system wherein another specific tuning means is shown.

Another type of antenna tuning means is shown in Fig. 3. Again the reference characters from Fig. 1 have been used where the nature of the elements has not changed. The variable inductance element used in this system consists of a saturable reactor element 215 having a saturating winding 232 and a core 234. Switch members 254 and 256 are operated by the keyer mechanism to apply direct current from a source such as battery 238 through a variable resistance 236 to the saturating coil 232 when the keyer is in the off or space position. The direct current saturates core 234 to reduce the effective inductance of coil 215 and tune the antenna circuit to the higher or space frequency. Keying the transmitter on opens the saturating circuit, increases the effective inductance of element 215 and lowers the resonant frequency of the antenna circuit. Variable resistance 236 may be adjusted to control the amount of direct current flow and hence the degree of saturation of core 234. The space resonant frequency may be set in this manner.

Figure 4:
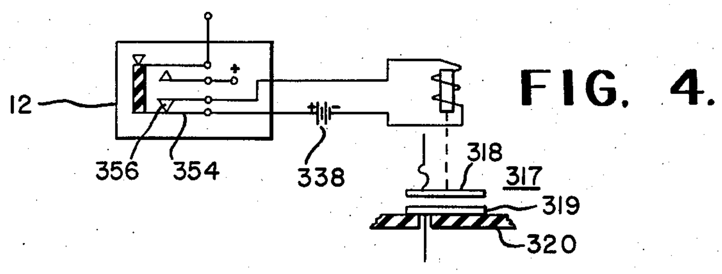
Fig. 4 and Fig. 5 are further showings of a portion of the system including still other specific tuning means for the antenna system.

Fig. 4 illustrates a mechanically operated frequency varying element which may be used in the system of Fig. 1. Switch contacts 354 and 356 operated by the keyer control the energization of the solenoid actuating element from the battery 238. The solenoid core operating through a mechanical linkage schematically shown by the dotted line raises the upper plate 318 of a variable condenser 317. A lower plate 319 of the condenser 317 remains in fixed position on an insulating base 320. The increase in spacing of the plates in response to the energization of the solenoid lowers the capacity of condenser 317. Condenser 317 may be used as the variable portion of the lumped capacitance element of Fig. 1.

Figure 5:
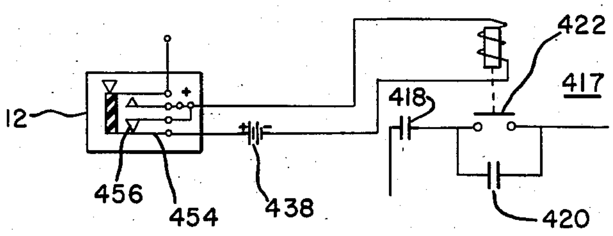

Fig. 5 shows another possible variation of the tuning means, the lumped capacitance 417 of the antenna system in this modification is made up of a pair of fixed condensers 418 and 420 connected in series, with a relay contact 422 operated by the solenoid core adapted to short circuit the condenser 420 upon energization of the transmitter and opening of the switch contacts 454 and 456. The arrangement for energization of the solenoid coil from battery 438 is the same as that shown in Fig. 4. In the space position of the keyer shown the two condensers are series connected with a low total value of capacitance tuning the antenna system to a high or space frequency. Operation of keyer 12 shuts condenser 420 increasing the effective capacitance and lowering the resonant frequency of the antenna system. As in the case of Fig. 4 the condensers shown make up the lumped capacitance of an antenna system such as that of Fig. 1.

The various modifications of specific tuning means used are shown by way of example only. It is obvious that any variable tuning elements known to the prior art may be used in the system disclosed. Thus tapped coils, movable coil or core means, short circuiting turns, etc., may be used.

The system disclosed herein is a novel frequency-shift keying apparatus which is applicable to existing amplitude-modulation transmitters. Its use increases the possible speed of transmission and increases the readability of signals. Spurious radiation, a fault common in prior art systems, is greatly reduced by the synchronous application of energy to the antenna system. In general, the ease and reliability of communication, particularly in the very low frequency range, is greatly increased.

Obviously many modifications and variations are possible in the light of the above teachings. It is therefore to be understood that within the scope of the appended claims the invention may be practiced otherwise than as specifically described.

What is claimed is:

1. A transmitter system comprising an oscillator requiring shock-excitation to cause it to generate alternating current, an antenna system, means coupling said oscillator to said antenna system, first shock-excitation means coupled to said oscillator to initially force it into oscillation, a second shock-excitation means for said oscillator comprising means coupled to said antenna system and responsive to circulating currents existing therein, and means coupling the output of said second shock-excitation means to said oscillator.

2. A transmitter system comprising an oscillator requiring shock-excitation to cause it to generate alternating current, an antenna system, means coupling said oscillator to said antenna system, a keying means connected to said oscillator to control transfer of energy from said oscillator to said antenna system, a first shock-excitation means adapted to be coupled to said oscillator to initially force it into oscillation, a second shock-excitation means for said oscillator, sampling means responsive to circulating currents in said antenna system, means coupled to said keying means and operated synchronously therewith to connect said sampling means to the second shock-excitation means, and means coupling said second shock-excitation means to said oscillator, whereby energy is supplied from the oscillator to the antenna system cophasally with existing circulating currents.

3. A transmitter system according to claim 2 wherein said means to connect the sampling means to said second shock-excitation means includes switching means.

4. A frequency shift transmitter system comprising an oscillator requiring shock excitation to cause it to generate alternating current, an antenna system including variable tuning means, means coupling said oscillator to said antenna system, a keying means connected to said oscillator to control transfer of energy from said oscillator to said antenna system, a first shock-excitation means adapted to be coupled to said oscillator to initially force it into oscillation, a second shock-excitation means for said oscillator, sampling means responsive to circulating currents in said antenna system, switching means connecting said sampling means to said second shock-excitation means, means coupling said second shock-excitation means to said oscillator and coupling means connecting said switching means and said variable tuning means to said keying means for operation synchronously therewith.

5. A transmitter system comprising an oscillator requiring shock-excitation to cause it to generate alternating current, an antenna system, means coupling said oscillator to said antenna system, a shock-excitation means for said oscillator comprising means coupled to said antenna system and responsive to circulating currents existing therein, and means coupling the output of said shock-excitation means to said oscillator.

References Cited in the file of this patent

UNITED STATES PATENTS

| | | |
|---|---|---|
| 2,357,398 | Gray | Sept. 5, 1944 |
| 2,358,454 | Goldstine | Sept. 19, 1944 |
| 2,386,844 | Davis | Oct. 16, 1945 |
| 2,454,845 | Sherman et al. | Nov. 30, 1948 |
| 2,609,490 | Hollywood | Sept. 2, 1952 |
| 2,653,223 | Musk et al. | Sept. 22, 1953 |
| 2,679,581 | Jacob et al. | May 25, 1954 |
| 2,712,061 | McClellan | June 28, 1955 |